US011860682B2

(12) United States Patent
Behandish et al.

(10) Patent No.: US 11,860,682 B2
(45) Date of Patent: Jan. 2, 2024

(54) METHOD AND SYSTEM FOR QUALITATIVE REASONING OF SPATIO-TEMPORAL PHYSICAL SYSTEMS

(71) Applicant: Palo Alto Research Center Incorporated, Palo Alto, CA (US)

(72) Inventors: Morad Behandish, Mountain View, CA (US); Johan de Kleer, Los Altos, CA (US); Randi Wang, Cupertino, CA (US)

(73) Assignee: XEROX CORPORATION, Norwalk, CT (US)

( * ) Notice: Subject to any disclaimer, the term of this patent is extended or adjusted under 35 U.S.C. 154(b) by 795 days.

(21) Appl. No.: 16/724,983

(22) Filed: Dec. 23, 2019

(65) Prior Publication Data

US 2021/0192105 A1    Jun. 24, 2021

(51) Int. Cl.
| | | |
|---|---|---|
| *G06F 30/20* | (2020.01) | |
| *G06N 5/04* | (2023.01) | |
| *G06F 30/23* | (2020.01) | |
| *G06F 111/04* | (2020.01) | |

(52) U.S. Cl.
CPC ............. *G06F 30/20* (2020.01); *G06N 5/04* (2013.01); *G06F 30/23* (2020.01); *G06F 2111/04* (2020.01)

(58) Field of Classification Search
CPC ........ G06F 30/20; G06F 2111/04; G06N 5/04
USPC .......................................................... 703/2
See application file for complete search history.

(56) References Cited

U.S. PATENT DOCUMENTS

| | | | | |
|---|---|---|---|---|
| 2007/0052705 | A1* | 3/2007 | Oliveira | G06F 30/18 |
| | | | | 345/419 |
| 2008/0059839 | A1* | 3/2008 | Hamilton | G05B 23/0251 |
| | | | | 714/26 |
| 2009/0112564 | A1* | 4/2009 | Schmieder | G06F 30/3323 |
| | | | | 703/21 |
| 2018/0096229 | A1* | 4/2018 | Bronstein | G06N 3/048 |
| 2021/0192105 | A1* | 6/2021 | Behandish, III | G06N 5/04 |

OTHER PUBLICATIONS

Jing Wu ("A Qualitative Spatio-Temporal Modelling and Reasoning Approach for the Representation of Moving Entities", Université de Bretagne occidentale, 2015, pp. 1-156) (Year: 2015).*
Nenzi et al. ("Qualitative and Quantitative Monitoring of Spatio-Temporal Properties With SSTL", Logical Methods in Computer Science, (2018) , pp. 1-38) (Year: 2018).*

(Continued)

*Primary Examiner* — Iftekhar A Khan
(74) *Attorney, Agent, or Firm* — Lippes Mathias LLP

(57) ABSTRACT

The techniques discussed herein generally relate to a method and system for qualitative modeling of and reasoning about the behavior of spatio-temporal physical systems. In some embodiments, qualitative representations based on Tonti diagrams are used to describe lumped or distributed parameter systems. Using a topological structure of the physical system, some embodiments generate qualitative governing equations as symbolic constraints on qualitative state variables. The qualitative constraints may be used to produce a qualitative simulation of the physical system. The qualitative simulation may be used to guide conceptual design iterations with given design criteria, or for instantiation of quantitative or hybrid (qualitative and quantitative) models and simulations.

16 Claims, 17 Drawing Sheets

(56) References Cited

OTHER PUBLICATIONS

Wang et al. hereafter Wang ("Topological semantics for lumped parameter systems modeling", Advanced Engineering Informatics 42 (2019), pp. 1-21) (Year: 2019).*
Maja Matetic (Qualitative Modeling of Object Behaviour in the Dynamic Vision System, 2001, ReserachGate, 2001, pp. 1-7) (Year: 2001).*
Benjamin Kuipers (Qualitative Simulation, Encyclopedia of Physical Science and Technology, 2001, pp. 287-300) (Year: 2001).*
Piergiorgio Alotto, Fabio Freschi, Maurizio Repetto, and Carlo Rosso. 2013. The cell method for electrical engineering and multiphysics problems: an introduction. vol. 230. Springer Science & Business Media.
Kenneth D Forbus. 1984. Qualitative process theory. Artificial intelligence 24, 1-3 (1984), 85-168.
Benjamin Kuipers. 1986. Qualitative simulation. Artificial intelligence 29, 3 (1986), 289-338.
E. Tonti. 2013. The Mathematical Structure of Classical and Relativistic Physics: A General Classification Diagram. Birkhäuser.

* cited by examiner

Constraint equations (Tonti)

$$\begin{cases} R: v = f^+(j) \\ C: Q = f^+(v) \\ L: \Phi = f^+(j) \end{cases}$$

$$\begin{cases} TF: j_1 = f^+(j_2), v_1 = f^+(v_2) \\ GY: j_1 = f^+(v_2), v_1 = f^+(j_2) \end{cases}$$

$$\begin{cases} KVL: \delta v = 0 \\ KCL: \delta j = 0 \end{cases}$$

$$\begin{cases} \delta e = v \\ \delta i = j \\ \delta \Psi = \Phi \\ \delta q = Q \end{cases}$$

$$\begin{cases} j = \delta^t(Q) \\ v = \delta^t(\Phi) \\ i = \delta^t(q) \\ e = \delta^t(\Psi) \end{cases}$$

$\longleftrightarrow$

Constraint equations (Kuipers)

$$\begin{cases} R: v_i = M^+(j_i) \\ C: Q_i = M^+(v_i) \\ L: \Phi_i = M^+(j_i) \end{cases}$$

$$\begin{cases} TF: j_1 = M^+(j_2), v_1 = M^+(v_2) \\ GY: j_1 = M^+(v_2), v_1 = M^+(j_2) \end{cases}$$

$$\begin{cases} KVL: ADD(v_{12}, v_{23}, ..., v_{n1}) = 0 \\ KCL: ADD(j_{12}, j_{23}, ..., j_{n1}) = 0 \end{cases}$$

$$\begin{cases} ADD(e_i, e_j, v_{ij}) = 0 \\ ADD(i_i, i_j, j_{ij}) = 0 \\ ADD(\Psi_i, \Psi_j, \Phi_{ij}) = 0 \\ ADD(q_i, q_j, Q_{ij}) = 0 \end{cases}$$

$$\begin{cases} Q_{ij} = DERIV(j_{ij}) \\ \Phi_{ij} = DERIV(v_{ij}) \\ i_i = DERIV(q_i) \\ e_i = DERIV(\Psi_i) \end{cases}$$

FIG. 4

Constraint equations (Tonti)

$\lambda : \mathbf{q} = f^+(\mathbf{g})$
$KCL : \delta \mathbf{q} = 0$
$\delta T = \mathbf{g}$

⟷
⟷
⟷

Constraint equations (Kuipers)

$\lambda : q_i = M^+(g_i)$
$KCL : ADD(q_{12}, q_{23}, ..., q_{n1}) = 0$
$ADD(T_i, T_j, g_{ij}) = 0$

METHOD AND SYSTEM FOR QUALITATIVE REASONING OF SPATIO-TEMPORAL PHYSICAL SYSTEMS

STATEMENT REGARDING FEDERALLY SPONSORED RESEARCH OR DEVELOPMENT

This invention was made with United States Government support under contract HR001118C0041 awarded by Defense Advanced Research Projects Agency (DARPA). The United States Government has certain rights in the invention.

BACKGROUND

The following relates generally to the qualitative simulation of physical systems. Current qualitative simulation techniques commonly predict the qualitative temporal behavior of a system while generally ignoring the spatial and geometric aspects. They are built on top of lumped parameter system models that abstract away the geometric information into lumped components. The existing techniques are not well suited to problems in which spatial aspects are important.

The approaches described herein overcome these drawbacks by incorporating both spatial and temporal aspects into qualitative models.

BRIEF DESCRIPTION

In one aspect, there is a device comprising: at least one processor; and at least one memory including computer program code. The at least one memory and the computer program code may be configured to, with the at least one processor, cause the device to: specify a topological structure of a physical system in space-time; construct a qualitative spatio-temporal model of the physical system; and using both the topological structure and the qualitative spatio-temporal model, simulate the qualitative spatio-temporal behaviors of the physical system as a discrete set of state transitions in space-time to produce a qualitative simulation of the physical system.

In some embodiments, in the device as described in the previous paragraph, the at least one memory and the computer program code are further configured to, with the at least one processor, cause the device to produce the qualitative spatio-temporal simulation using an existing qualitative reasoner based on lumped parameter models. In some embodiments, the qualitative spatio-temporal model of the physical system is expressed by topological semantics based on Tonti diagrams. In some embodiments, the at least one memory and the computer program code are further configured to, with the at least one processor, cause the device to: specify design criteria; and test the simulation against the design criteria. In some embodiments, the at least one memory and the computer program code are further configured to, with the at least one processor, cause the device to use the qualitative simulation results to modify the qualitative spatio-temporal model/parameters of the physical system.

Notably, in accordance with embodiments disclosed herein, methods are provided for taking an existing qualitative reasoner purposed for temporal-only simulation and re-purposing it for spatio-temporal simulation without having to make any significant changes to the existing reasoner (i.e., treating the existing reasoner as "black-box" solver).

In some embodiments, the at least one memory and the computer program code are further configured to, with the at least one processor, cause the device to perform the following operations: (i) specify at least one design criteria in qualitative terms; (ii) run the qualitative simulation with the set of qualitative parameters of the physical system; (iii) compare the results of (ii) against the specified design criteria in (i) and quantify the discrepancy; (iv) update at least one of a set of qualitative parameters of the physical system to ameliorate the discrepancy quantified in (iii); and (v) iterate though operations (ii)-(iv) until the results of the qualitative simulation of the physical system obtained in (ii) satisfy the design criteria in (i). In some embodiments, the at least one memory and the computer program code are further configured to, with the at least one processor, cause the device to: using fully provided quantitative spatio-temporal model of the physical system, and instantiate the qualitative spatio-temporal model of the physical system into a quantitative model. In some embodiments, the at least one memory and the computer program code are further configured to, with the at least one processor, cause the device to: using partially provided quantitative information for the spatio-temporal model of the physical system, instantiate the qualitative spatio-temporal model of the physical system into a combined qualitative/quantitative model. In some embodiments, the at least one memory and the computer program code are further configured to, with the at least one processor, cause the device to: using fully or partially provided quantitative information for the spatio-temporal model of the physical system, instantiate the qualitative spatio-temporal model of the physical system into a combined qualitative/quantitative model; and simulate the spatio-temporal behavior using one of qualitative, quantitative, or hybrid computational tools.

In another aspect, there is a device for generating qualitative constraints that govern the qualitative spatio-temporal behavior of a physical system, the device comprising: at least one processor; and at least one memory including computer program code. The at least one memory and the computer program code may be configured to, with the at least one processor, cause the device to: specify a topological structure of the physical system in space-time; and using the topological structure, generate the qualitative constraints in symbolic form. In some embodiments, the qualitative constraints are used alongside design criteria to optimize for qualitative behavior as described in the algorithmic steps (i)-(v) of the previous paragraph.

In some embodiments, in the device as described in the previous paragraph, the at least one memory and the computer program code are further configured to, with the at least one processor, cause the device to generate the qualitative constraints expressed in terms of topological operations such as boundary and co-boundary operations on the specified topological structure in space-time. In some embodiments, the at least one memory and the computer program code are further configured to, with the at least one processor, cause the device to feed the qualitative constraints into a qualitative simulation tool to produce a qualitative spatio-temporal simulation of the physical system. In some embodiments, the at least one memory and the computer program code are further configured to, with the at least one processor, cause the device to: feed the qualitative constraints into a qualitative simulation tool to produce a simulation of the physical system; and use the qualitative simulation of the physical system to modify a qualitative model/parameters of the physical system.

In some embodiments, the at least one memory and the computer program code are further configured to, with the at least one processor, cause the device to perform the following operations: (i) specify a design criteria; (ii) update at least one of a set of qualitative parameters of the simulation of the physical system by either: (a) testing parameters of the set of qualitative parameters one by one, or (b) determining a most sensitive parameter of the set of qualitative parameters, and updating the most sensitive parameter; and (iii) iterate though operation (ii) until the results of the simulation of the physical system satisfy the design criteria. In some embodiments, the at least one memory and the computer program code are further configured to, with the at least one processor, cause the device to: use the generated qualitative constraints to produce a qualitative model of the physical system; and using quantitative information of the physical system, instantiate the qualitative model into a quantitative model. In some embodiments, the at least one memory and the computer program code are further configured to, with the at least one processor, cause the device to: use the generated qualitative constraints to produce a qualitative model of the physical system; and using fully or partially provided quantitative information of the physical system, instantiate the qualitative model into a combined qualitative/quantitative model; and simulate the spatio-temporal behavior using one of qualitative, quantitative, or hybrid computational tools.

One advantage of the approach(es) described herein lies in enabling a qualitative spatio-temporal analysis of physical systems based on a distributed model (in space or space-time) that was not previously possible. Specifically, previously known techniques for temporal and (less commonly) spatial qualitative analysis (e.g., of qualitative reasoning based on lumped parameter models) commonly cannot reason qualitatively about higher-order geometric elements such as surfaces and volumes to which physical quantities are associated. Therefore, the prior existing methods generally cannot produce the qualitative spatio-temporal analysis results achieved by the techniques described herein.

Another advantage of the approach(es) described herein lies in enabling qualitative temporal or spatio-temporal reasoning about multi-physics systems.

BRIEF DESCRIPTION OF THE DRAWINGS

FIG. 4 shows the correspondence between the governing equations in lumped parameter models based on Tonti diagrams and qualitative process theory based on Kuipers model.

DETAILED DESCRIPTION

Figure 1:
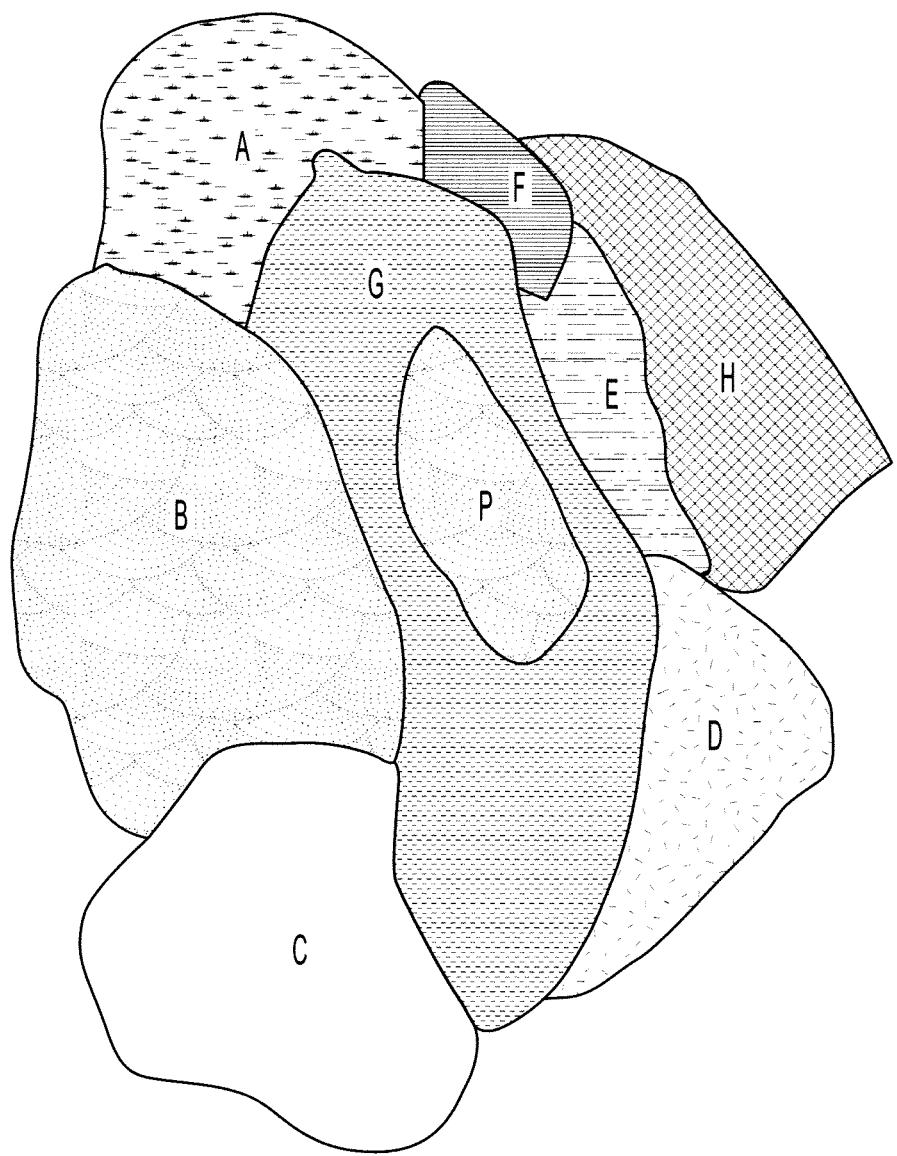
FIG. 1 shows the spatial aspects of an example of wildfire smoke in which one desires to quickly predict the qualitative behavior of the spreading smoke across the landscape before or instead of costly quantitative simulation.

The following discloses a method for qualitative modeling of and reasoning about the behavior of spatio-temporal physical systems. As is understood in the art, qualitative simulation maps non-numerical specifications of physical systems to non-numerical descriptions of the behavior of the physical systems. Put another way, qualitative analysis is essentially a reasoning technique used to determine the possible qualitative states of system variables based on a qualitative description of the system's topology, initial conditions, and governing equations. For example, a qualitative analysis of a circuit might show the pathways that the circuit can experience in terms of the signs (negative, zero, or positive) of physical variables such as current and voltage or their rates of change over time, without performing precise quantitative simulation. In another specific example, the qualitative analysis of a circuit might show that a resistor exists at a particular location on the circuit, which implies a certain qualitative relationship between voltage and current, but would not necessarily show the resistance value of the resistor, which is the quantitative voltage-current ratio. Qualitative simulation generally produces non-numerical descriptions of physical systems and/or the behavior of the physical systems, by essentially using a reasoning technique to determine the qualitative values and change directions of system variables.

The disclosed method is to not only perform qualitative temporal analysis through a sequence of discrete time-steps that capture qualitative changes of state, but also to reason qualitatively over discrete spatial regions. Moreover, some embodiments use existing computational techniques for temporal qualitative reasoning (QR). In some embodiments, temporal QR computational techniques are repurposed to use existing QR solvers with virtually no alteration to the QR solver in order to solve spatio-temporal QR problems. Some embodiments present qualitative models based on a well-known algebraic topological abstraction of physical systems using Tonti diagrams.

Although qualitative reasoning techniques for spatial reasoning have been developed, they are mostly ad hoc and rely on qualitative temporal reasoning on the possible evolution of a physical system (with or without spatial variables) through a sequence of discrete events in time. The foregoing dynamical system models are often described in terms of ordinary differential equations (ODE) and differential algebraic equations (DAE), which are qualitatively analyzed through a sequence of discrete events in time. Commonly, in accordance with the foregoing, all physical quantities (including spatial variables) are dependent on time, which is the only independent variable. The prior existing methods generally do not reason qualitatively about truly spatio-temporal system models described by partial differential equations (PDE), and their integral, discrete, and algebraic forms, in all of which spatial coordinates are also independent variables. The prior existing approaches are commonly not equipped with reasoning tools to handle these models because one cannot move along spatial coordinates akin to a time axis with underlying assumptions of uni-directional evolution and causality. Conversely, the approach(es) described herein enable qualitative reasoning on such spatio-temporal models.

Spatio-temporal system models can be expressed via more advanced and modern languages of mathematical physics such as differential forms and (continuous or discrete) exterior algebra and calculus. The approach described herein is well-suited to apply qualitative and hybrid (qualitative+quantitative) reasoning to system models described with such languages.

Specifically, the following will first introduce how Tonti diagrams can be used to qualitatively model lumped parameter systems with "lumped" spatial distribution and compare it to qualitative models based on lumped parameter models. Then, this disclosure will introduce how the corresponding model based on Tonti diagrams is extended to include spatially distributed systems by treating physical parameters as measurable discrete or continuum entities over the space rather than lumped objects. Examples of practical applications will also be discussed.

One advantage of the embodiment based on Tonti diagrams is its ability to perform qualitative reasoning on spatio-temporal multi-physics models, where physical behavior is governed by differential, integral, or discrete equations from different domains of physics (e.g., solid mechanics, fluid mechanics, heat transfer, electromagnetism, optics, ion transport, and chemical reactions) that may be coupled in both space and time. Using the common underlying structure of all physical theories of classical and relativistic physics, Tonti diagrams enable constructing multi-physics models in a unified language and mapping them to qualitative form to solve using the same tools that are applied for solving lumped parameter models based on single physics.

1 Introduction

Existing methods for 'qualitative physics' have so far focused mainly on lumped parameter systems. As is understood in the art, a lumped parameter system model (such as a simple circuit diagram) abstracts away all the detailed geometric information of the physical systems such as the spatial dimensions of components (e.g., the shape, dimensions, and material distribution of a tire in an automobile suspension system) and encapsulate them in terms of lumped properties (e.g., mass, stiffness, and damping of the tire). For example, in a lumped parameter circuit diagram, a 'resistor' is abstracted by its only relevant property called resistance, which implies a constitutive physical law (Ohm's law) relating the voltage across the resistor to the current passing through it. The shape, material, and other details are not explicitly modeled. For quantitative analysis of lumped parameter models, the temporal behavior is generally represented by 'signals'. For qualitative reasoning on lumped parameter models, the temporal behavior is generally represented as a sequence of discrete events along the time axis. Each event is typically characterized by a qualitative change of state, e.g., a physical variable changing sign from negative to positive or vice versa, without worrying about the precise numerical values.

Spatially distributed systems are different in that their quantitative analysis requires representation by 'fields' in space and time, rather than just 'signals' in time. Research on qualitative modeling of spatially distributed systems is still in its infancy and is only addressed by rather limited efforts. It is believed that there is no clarification and formalization of the qualitative mathematics behind the structural description and behavioral prediction of such models, rendering them ad hoc, hard to generalize, and even harder to automate. Successful spatio-temporal qualitative modeling and simulation would broaden the application of qualitative reasoning in behavioral prediction and diagnostics of engineering (e.g., mechanical, fluidic, thermal, and electromagnetic) systems whose lumped parameter analysis is not representative of the reality, qualitatively or quantitatively. In such systems, the geometric knowledge may not be complete in that either the information is not available or cannot be described by existing methods. For example, consider a wildfire at one county in California as illustrated schematically in FIG. 1. The manner in which the smoke will spread to surrounding counties is a typical problem whose qualitative analysis requires simultaneously reasoning in both space and time. This natural phenomenon involves a number of distributed parameters such as the temperature of different particles suspended in the air, wind speed, flame length, fire-line intensity, and so on, whose interactions are difficult to describe precisely by quantitative analysis using existing numerical methods (e.g., solving coupled partial differential equations).

2 Qualitative Models of Physics

Tonti diagrams classify all fundamental theories of physics using the language of algebraic topology, and can be used as the common semantic model for qualitative (lumped and distributed) parameter systems [R. Wang and V. Shapiro. 2019. Topological semantics for lumped parameter systems modeling. Advanced Engineering Informatics, 42, 100958]. In other words, this language subsumes existing more limited qualitative and quantitative languages, representations, and simulation tools of physics. Some embodiments use Tonti diagrams as a generic language for qualitative modeling and simulation.

2.1 Qualitative Models of Lumped Parameter Systems Via Tonti Diagrams

Figure 2:
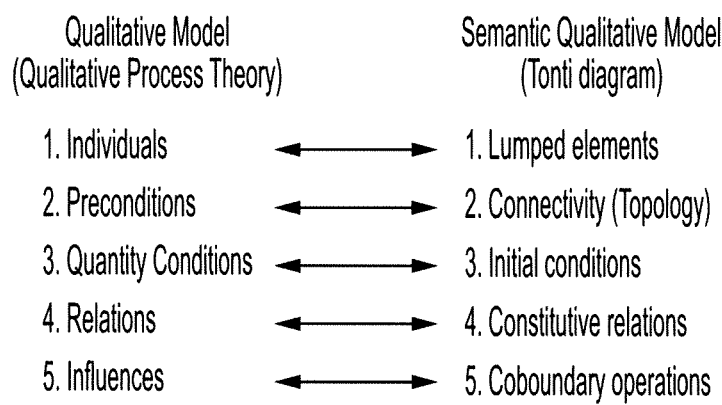
FIG. 2 illustrates an example correspondence between qualitative model based on qualitative process theory concepts and lumped parameter model concepts based on Tonti diagrams.

FIG. 2 shows an example of the correspondence of concepts used in lumped parameter models and the qualitative modeling language proposed in qualitative process theory (QPT).

While Tonti diagrams have been used for classifying physical theories predominantly with quantitative applications in mind, never before have they been used for qualitative reasoning, which is one of the novel aspects disclosed herein. As described herein, the qualitative states of physical variables can be systematically organized as nodes on Tonti diagrams used to classify physical theories including those used for lumped parameter models and network theory. In addition, the governing equations of qualitative models that constrain the qualitative states can be symbolically expressed as arrows on the Tonti diagrams.

Figure 3:
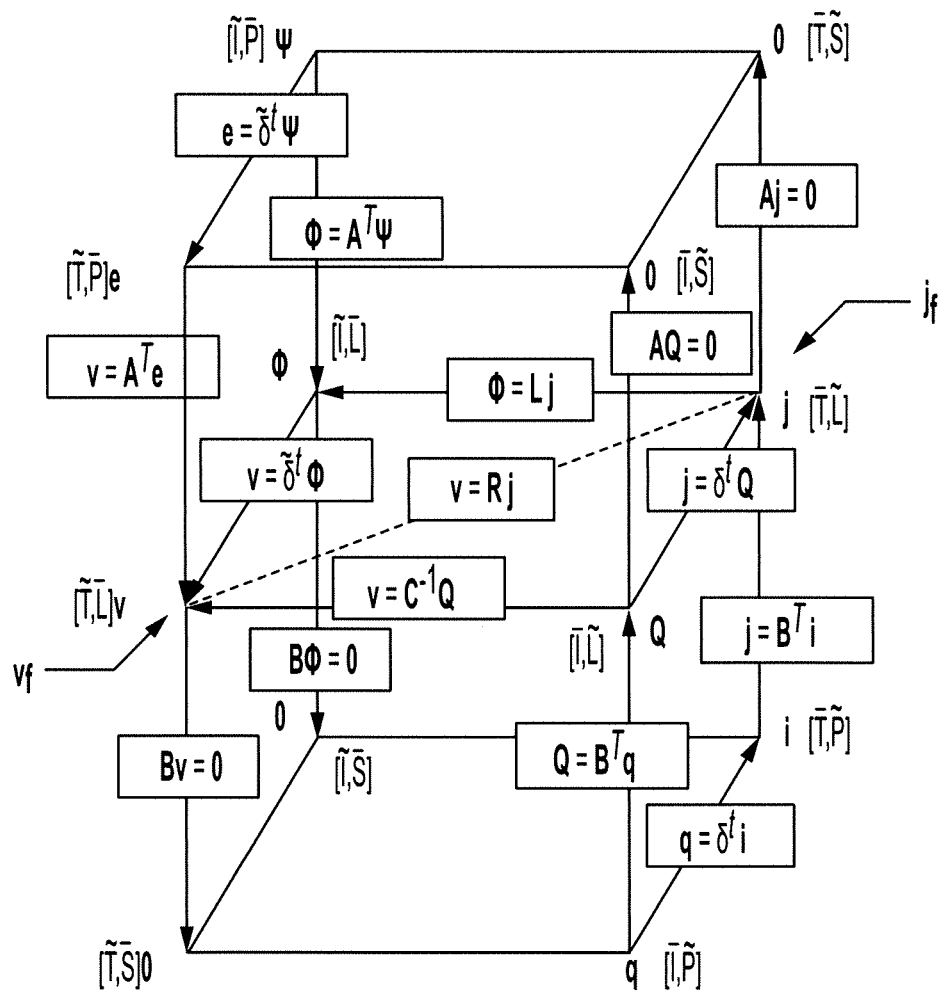
FIG. 3 illustrates a Tonti diagram graphically representing governing differential equations of a generic lumped parameter model.

Consider the lumped parameter model of an RLC electrical circuit represented by the Tonti diagram in FIG. 3. The constraint equations of this model are those equations associated to the arrows listed below, grouped in terms of the equation types shown in the following Tables 1-5.

TABLE 1

Qualitative 'defining' (space difference) equations—these equations are exact.

| | |
|---|---|
| Voltage Definition: | $v := \delta^s[e]$ |
| Current Definition: | $j := \delta^s[i]$ |
| Magnetic Flux Definition: | $\Phi := \delta^s[\psi]$ |
| Charge Definition: | $Q := \delta^s[q]$ |

TABLE 2

Qualitative 'defining' (time difference) equations—these equations are exact.

| | |
|---|---|
| Charge/Current Relation: | $j := \delta^t[Q]$ |
| Potential/Voltage Relation: | $v := \delta^t[\Phi]$ |
| Charge/Current Relation: | $i := \delta^t[q]$ |
| Potential/Voltage Relation: | $e := \delta^t[\psi]$ |

TABLE 3

Qualitative 'topological' (circuital) equations—these equations are exact.

| | |
|---|---|
| Kirchhoff's current law (KCL): | $\delta^s[v] = 0$ |
| Kirchhoff's voltage law (KVL): | $\delta^s[j] = 0$ |

TABLE 4

Qualitative 'constitutive' equations—the equations are not exact.

| | |
|---|---|
| The law of Resistance: | $v = f^{\pm}(j)$ |
| The law of Capacitance: | $Q = f^{\pm}(v)$ |
| The law of Inductance: | $\Phi = f^{\pm}(j)$ |

TABLE 5

Qualitative 'interaction' equations—these equations are not exact.

| | |
|---|---|
| CC and VV: | $j_1 = f^{\pm}(j_2), v_1 = f^{\pm}(v_2)$ |
| CV and VC: | $j_1 = f^{\pm}(v_2), v_1 = f^{\pm}(j_2)$ |

Notice that the equations in tables 1 through 3 are exact, meaning that the qualitative and quantitative forms are indistinguishable. However, the equations in tables 4 and 5 are obtained by "weakening" the phenomenological constraints in quantitative forms, represented by linear (in this case) or nonlinear (in general) relations. By "weakening" the constraint, it is meant that the quantitative differences among infinitely many different constraints of the same qualitative nature are ignored, and the equivalence class of all such relations that share a common qualitative nature is represented uniformly by a monotonic function $f^{\pm}$ where +/− mean monotonically increasing/decreasing, respectively. In this example, all relations in tables 4 and 5 are normally monotonically increasing, e.g., increasing the voltage across a resistor of constant resistance increases the current passing through the resistor (qualitative form of Ohm's law represented by the qualitative equation $v = f^{\pm}(j)$).

FIG. 4 shows an example of the correspondence of the constraint equations used in the Kuipers model and Tonti diagram model. According to techniques described herein, the constraint equations in Kuipers model can be directly fed into existing qualitative simulation tools such as Kuipers QSIM by using their counterpart Tonti Diagram. It should be understood that Kuipers model is one qualitative reasoning technique, and parts of this disclosure discuss Kuipers model as an example qualitative reasoning technique that is representative of the main features of it alternatives. Some embodiments use Kuipers model while other embodiments use other qualitative reasoning tools.

2.2 Qualitative Models of Spatially Distributed Systems Via Tonti Diagrams

One advantage of Tonti diagrams over other existing languages for expressing network theory, system models, and qualitative models is their extensibility to spatio-temporal physical phenomena expressed in terms of fields in space-time, such as fluid dynamics, thermal conduction, elastodynamics, electromagnetics, etc. FIG. 3 shows an exemplary Tonti diagram. However, it is to be understood that Tonti diagrams cover other areas of classical and relativistic physics as well. Thus, some embodiments use other Tonti diagrams in other areas of physics such as fluid dynamics, thermal conduction, elastodynamics, electromagnetics, etc.

Figures 5A, 5B:
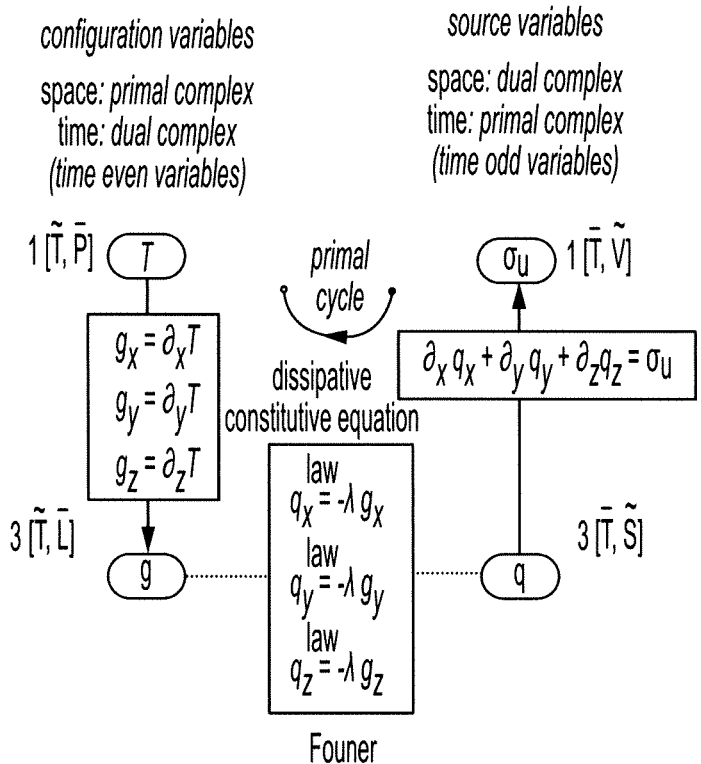
FIG. 5A shows an example Tonti diagram of spatio-temporal thermal conduction in solids.
FIG. 5B shows the correspondence between the equations of FIG. 5A, and a qualitative reasoner.

FIG. 5A shows an example of Tonti diagram of steady-state thermal conduction in solids, where T stands for temperature, g stands for temperature gradient, λ stands for thermal conductivity, q stands for heat current density, and $\sigma_u$ stands for heat source (volumetric content). All of these physical quantities are represented by scalar, vector, or tensor fields in both space and time, making their qualitative representation less obvious. FIG. 5B shows the correspondence between the equations of FIG. 5A, and a qualitative reasoning tool.

To generate the constraint equations, the space will be first discretized by a cell complex that includes an inter-connected network (technically, hyper-graph) of 0-, 1-, 2-, and 3-dimensional 'cells' (i.e., points, curve segments, surface patches, and volume chunks) so that the partial derivative can be qualitatively represented by the co-boundary operations $\partial^t$ and $\delta^s$ in time and space, respectively. The quantitative equivalent of this representation is studied in numerical physics as the 'cell method' and is understood to generalize many numerical approaches such as finite difference, finite element, and finite volume methods in computational solid and fluid mechanics. As discussed herein, the qualitative formulation is obtained by "weakening" the constitutive relations, as was shown above for lumped parameter models, by using monotonic functions $f^{\pm}$ to uniformly represent equivalence classes of numerical functions that are qualitatively similar. The resulting constraint equations are:

Qualitative 'defining' equation:

Temperature spatial differentiation: $g = \delta^s[T]$

Qualitative 'topological' equation:

Conservation of thermal energy: $\delta^s[q] = \sigma_u$

Qualitative 'constitutive' equation:

The law of thermal conduction: $q = f^{-}(g)$

This symbolic unification allows the systems and methods described herein to use computational techniques for qualitative simulation, such as qualitative simulation (QSIM) for QPT simulations, to be used directly without ad hoc adaptation.

3 Exemplary Extensions

Existing methods in qualitative physics focus on lumped parameter models, simply because temporal qualitative simulation over a discrete set of totally ordered time instants lends itself better to causal inference. Extending these ideas to spatial and spatio-temporal QR has not received attention because it is unclear how such inference would generalize in spaces that are higher-dimensional than 1D time (e.g., 3D space and 4D space-time).

This disclosure proposed a formal semantic qualitative model of physics by using standard tools from algebraic topology and results in classification of physical theories and systems. In contrast to their originally intended and/or conventional use/interpretation, as used in accordance with embodiments described herein, Tonti diagrams provide a canonical representation for reasoning about qualitative behaviors of both lumped and distributed parameter models within a unified computational framework. The spatial qualitative analysis is handled by applying co-boundary operators, interpreted as the qualitative counterpart for discrete space and/or time differentiation in quantitative analysis, using the topological structure of the physical system.

One advantageous aspect is to provide immediate support for automatically generating interfaces to both qualitative analysis (e.g., 'envisioner' or QSIM) and quantitative analysis (e.g., MODELICA and SYSML) without a need to resolve individual assumptions and differences of distinct simulation models. Specifically, such a seamless integration enables automation when numerous qualitative simulations are needed, in applications such as conceptual design (which is largely manual/artisan today). Moreover, each 'concept' can be immediately instantiated into quantitative models to be evaluated via existing numerical simulation tools for various quantitative parameters, to support subsequent preliminary design, detailed design, and optimal design activities in the engineering workflow.

Figure 6A:
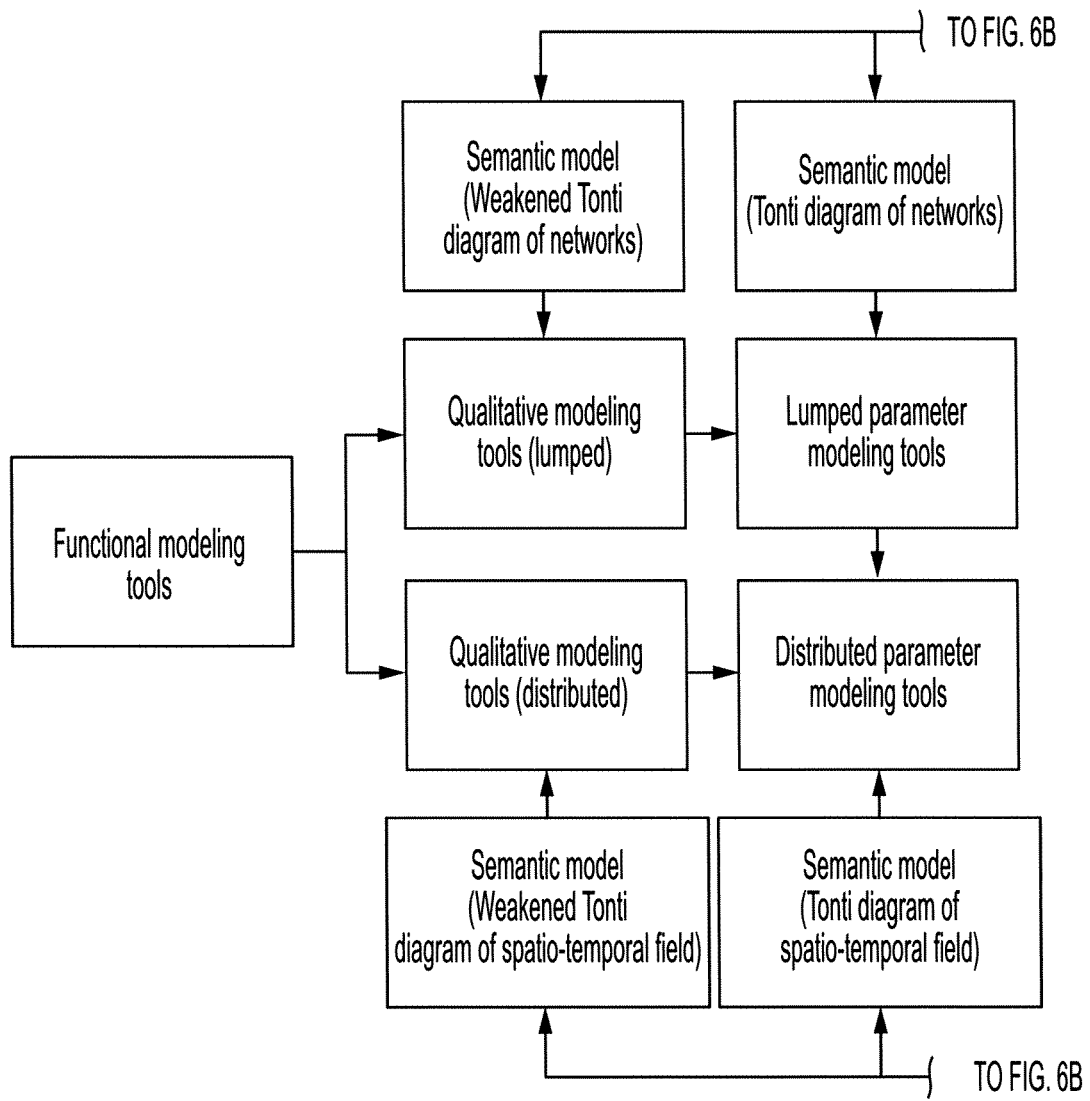
FIGS. 6A and 6B shows an example flowchart including the engineering design framework for integration of qualitative and quantitative reasoning.
Figure 6B:
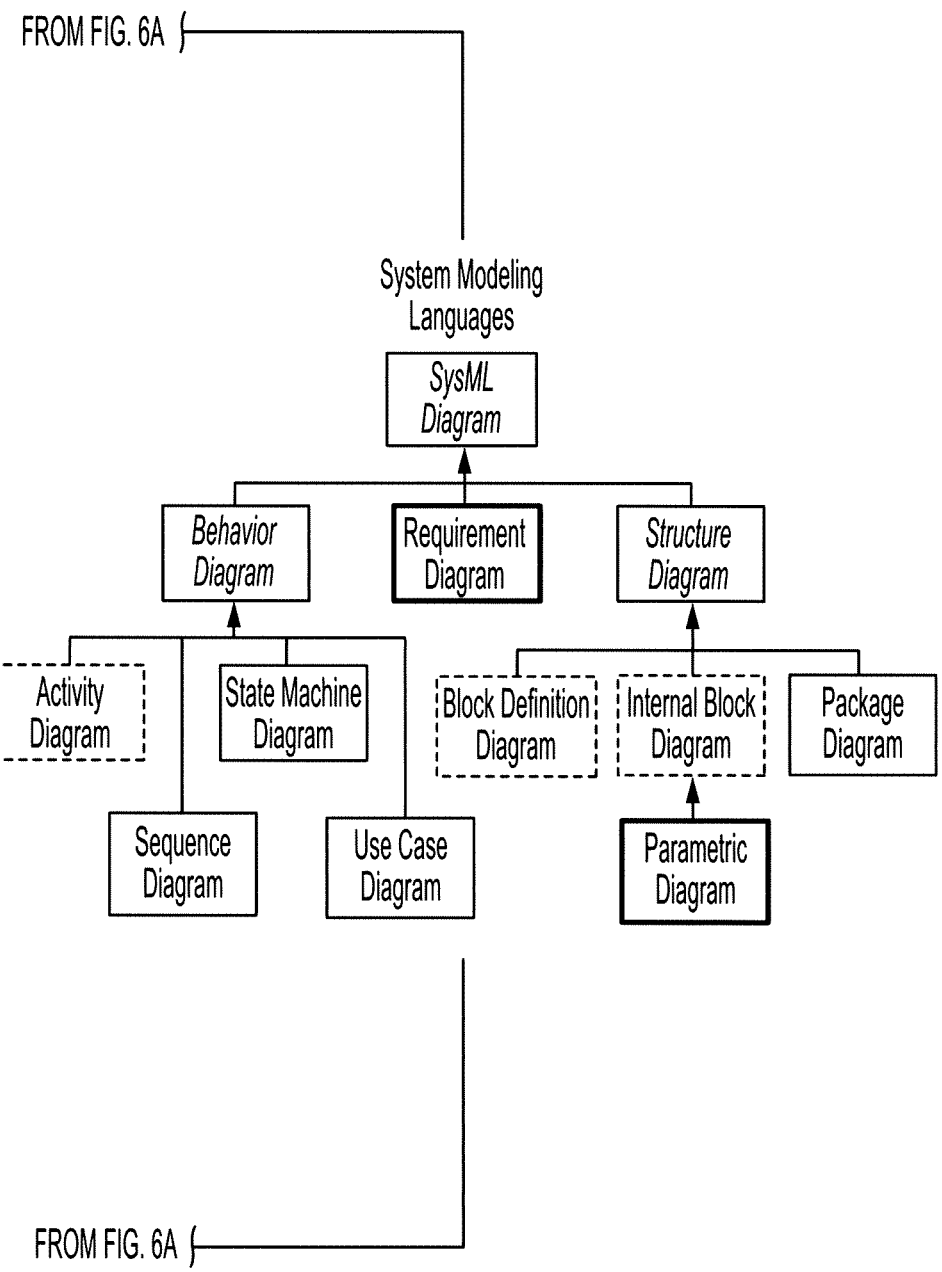
Figure 7A:
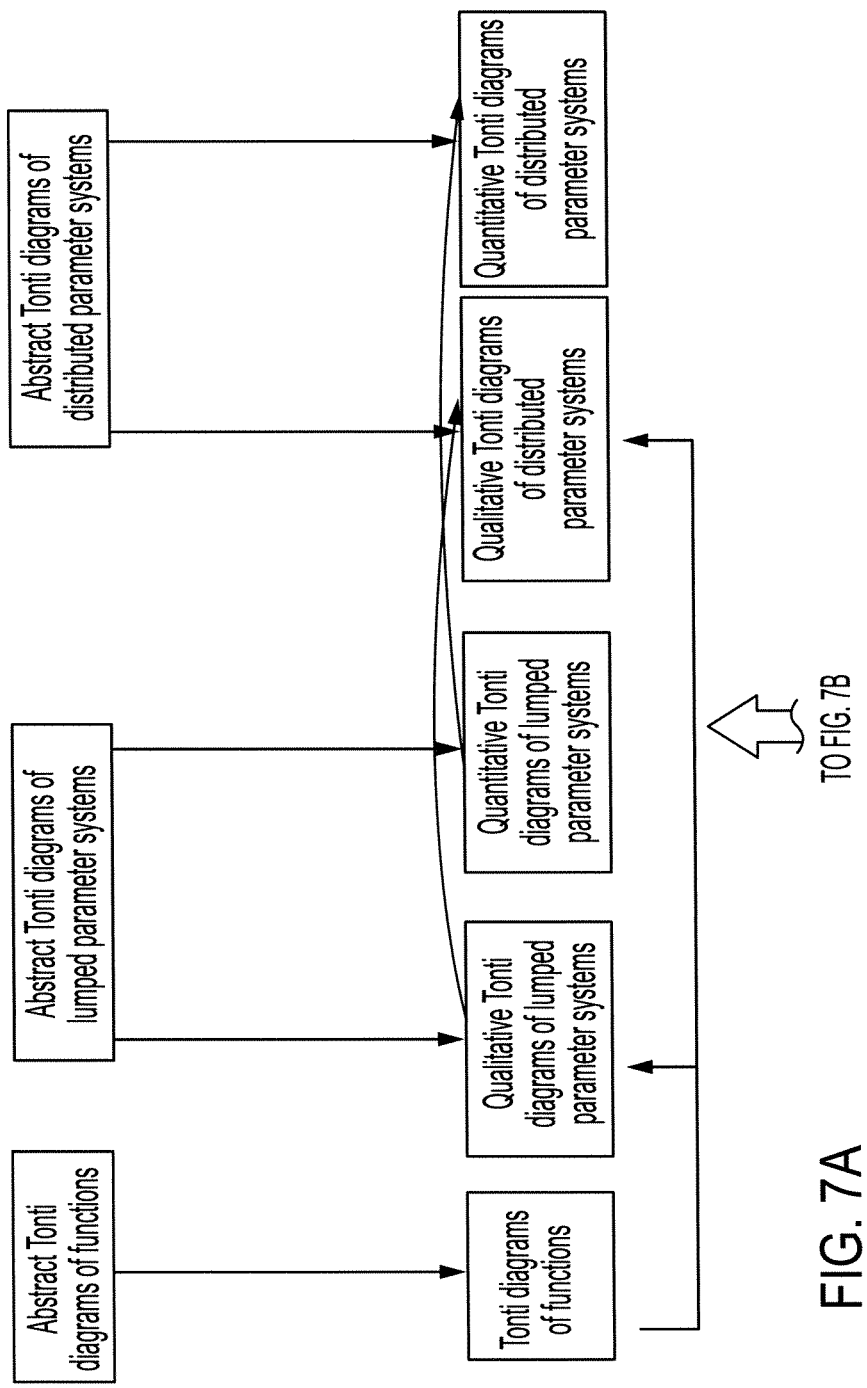
FIGS. 7A and 7B illustrate an embodiment of the engineering design framework for integration of qualitative and quantitative reasoning.
Figure 7B:
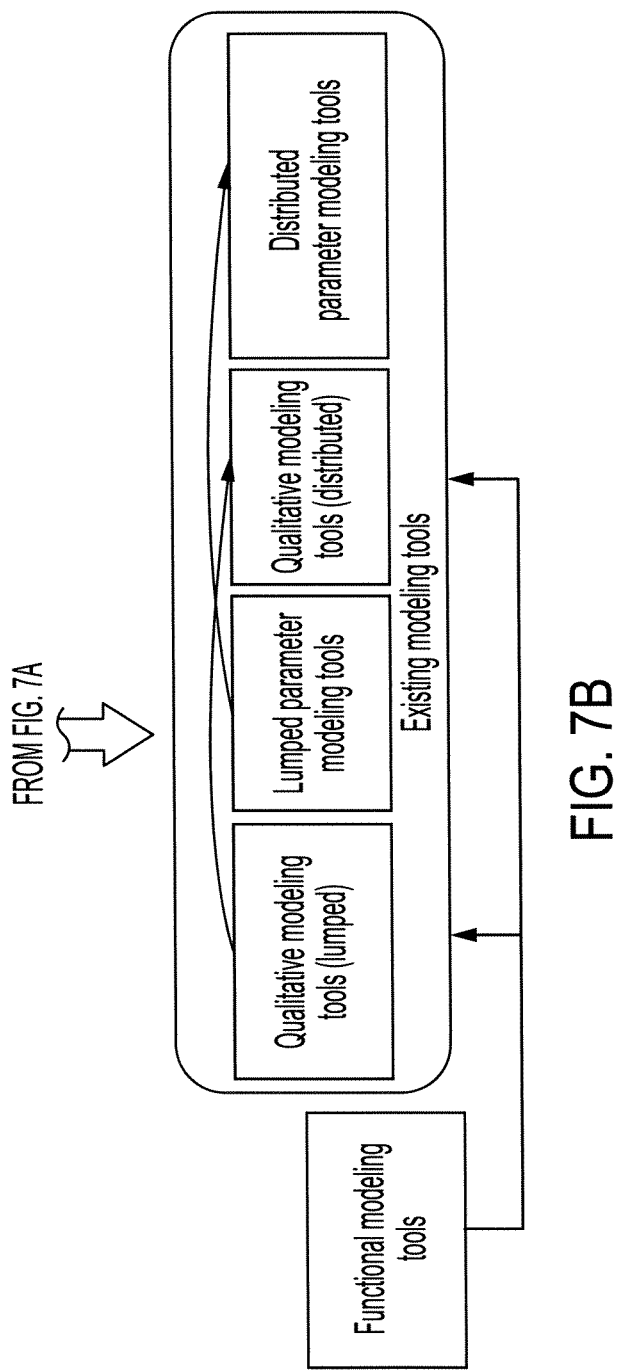

FIGS. 6, 7A and 7B illustrate a generalization of the systems and methods described herein in which a common semantic model is used for both qualitative and quantitative reasoning on both lumped and distributed parameter models. Every qualitative model can be instantiated into a quantitative or even hybrid model using (fully or partially provided) numerical assignments to the physical variables.

The following will discuss three additional example applications of the systems and methods described herein. The following will directly explain such examples by describing what the qualitative simulation result may look like.

Example 1: Weather Forecast

Figure 8:
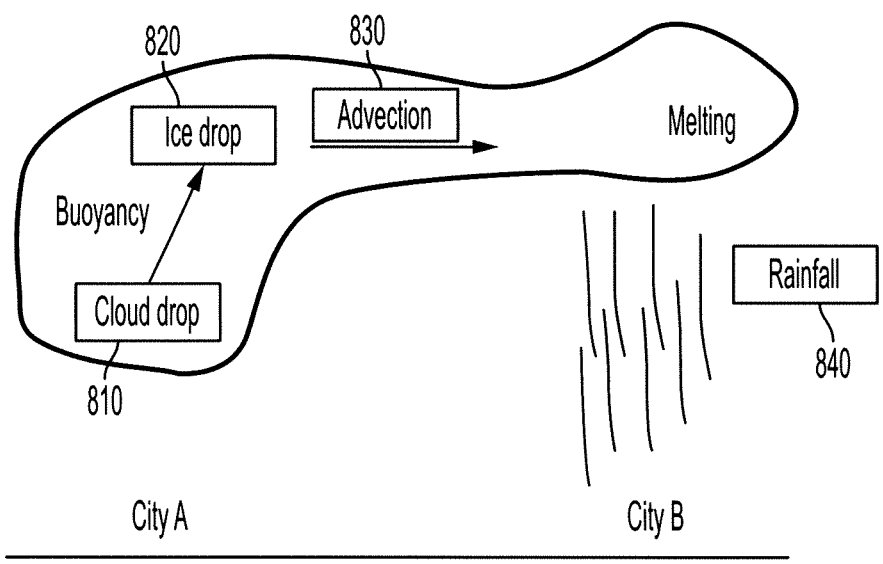
FIG. 8 shows an example relating to a weather forecast that can be modeled in accordance with embodiments described herein.

Suppose there is a qualitative distributed parameter model of cloud drops created in the lower-middle layer of the sky. If the temperature of the air patch increases, then the air patch rises due to the buoyancy. With reference to FIG. 8, cloud drops 810 can be supported by the air patch and then raised; cloud drops become ice drops/crystals as they rise. The air patch rises up to the level of free convection. The ice drops 820 move horizontally due to the convection. During the advection 830, precipitation particles are not supported by updraft and tend to fall. The area where precipitation particles fall is where rainfall 840 occurs. It can be seen from this example that the physical quantities (e.g. position, density of the air, velocity of air flow, temperature, heat flux, state of the matter such as solid or gas) are functions of both space and time. The simulation of qualitative lumped parameter model of cloud drops cannot achieve such results (e.g. modeling both space and time). On the other hand, a qualitative distributed parameter model in accordance with the aspects described herein can model this example.

Example 2: Crack Detection

Figure 9:
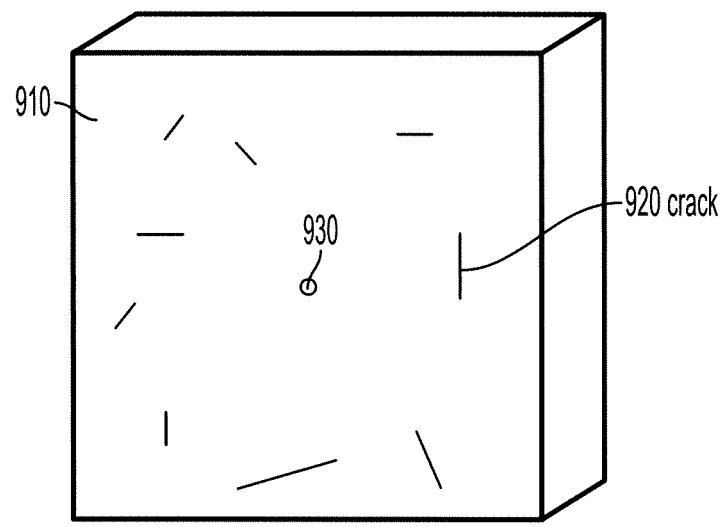
FIG. 9 shows an example relating to crack detection that can be modeled in accordance with embodiments described herein.
Figure 14A:
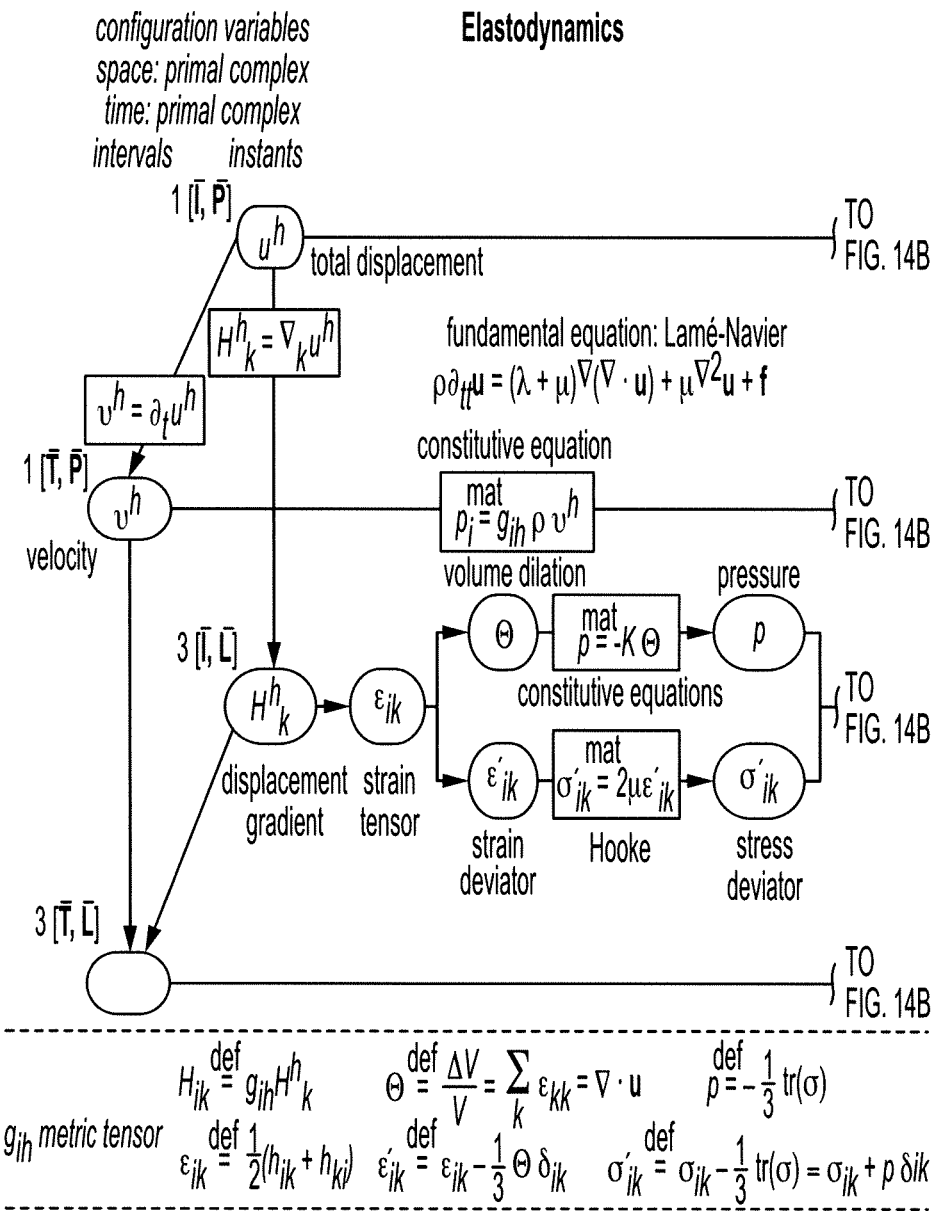
FIGS. 14A and 14B show a Tonti diagram of Elastodynamics.
Figure 14B:
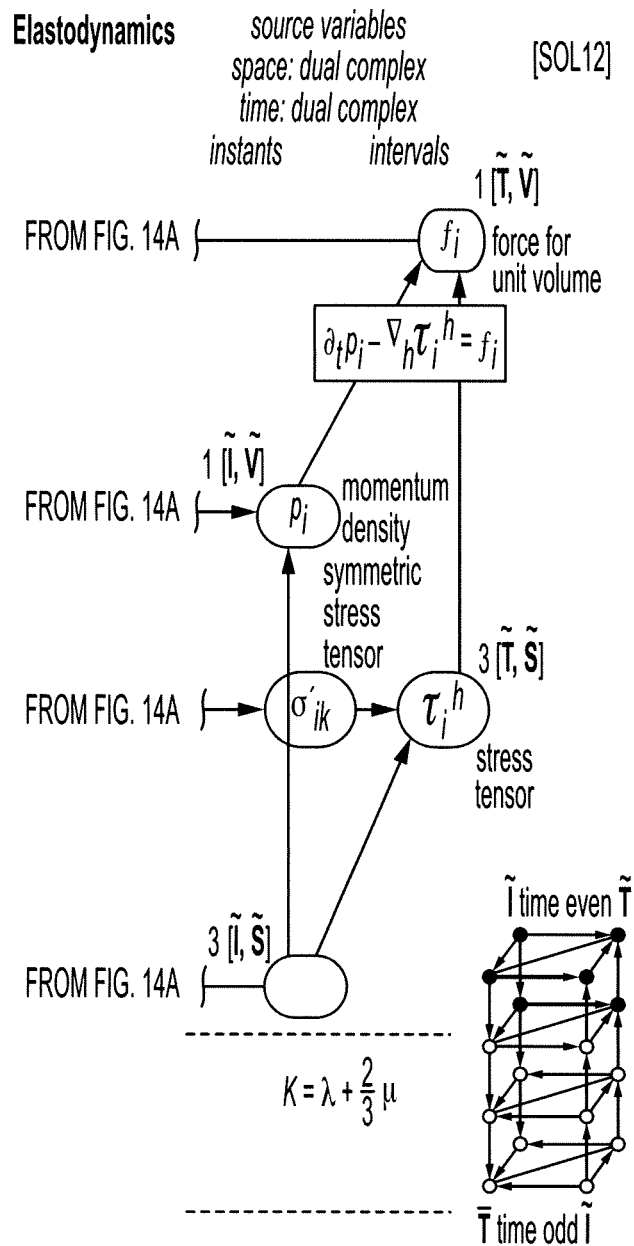

Suppose there is a qualitative distributed parameter model (represented by Tonti diagrams) of a 3D metallic box 910 made of aluminum alloy with cracks 920, as shown in FIG. 9. By adding a wave source 930 at the center of one surface of the 3D metallic box 910, after the qualitative simulation, it is possible to find the position of the cracks 920 by checking at what positions there is a sudden change of the wave amplitudes. Such changes are not only a function of time but also a function of space. FIGS. 14A and 14B show a Tonti diagram that may be used for this example.

Example 3: Human Body Damage Prediction

Figure 10B:
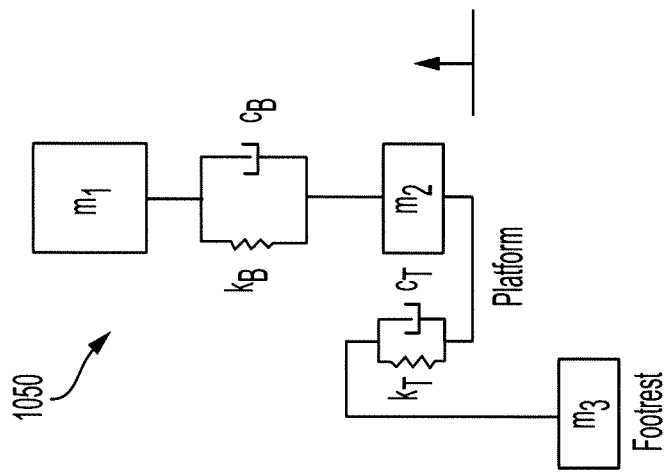
FIG. 10B shows an example lumped parameter model of the seated human body of FIG. 10A.
Figure 10A:
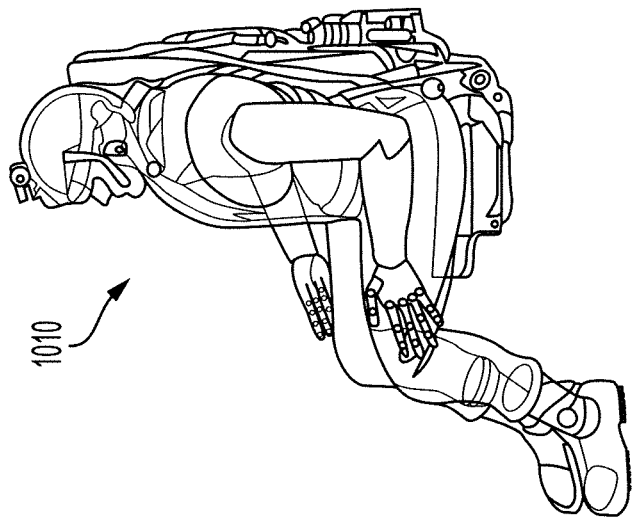
FIG. 10A shows an example relating to a seated human body that may be modeled for conceptual vehicle design.

Suppose there is a qualitative distributed parameter model (represented by Tonti diagrams) of a 3D seated human body 1010, as shown in FIG. 10A. If a vibration source is added to the platform, after the qualitative simulation, it is possible to generate the qualitative relation between the vibration frequency and the damage of different organs, where the latter one can be defined as the relative qualitative velocity between neighboring organs. Since organs are located at different positions in the human body, the simulation of qualitative lumped parameter model 1050 of FIG. 10B on the right side cannot get similar results. FIGS. 14A and 14B show a Tonti diagram that may be used for this example.

Figure 11:
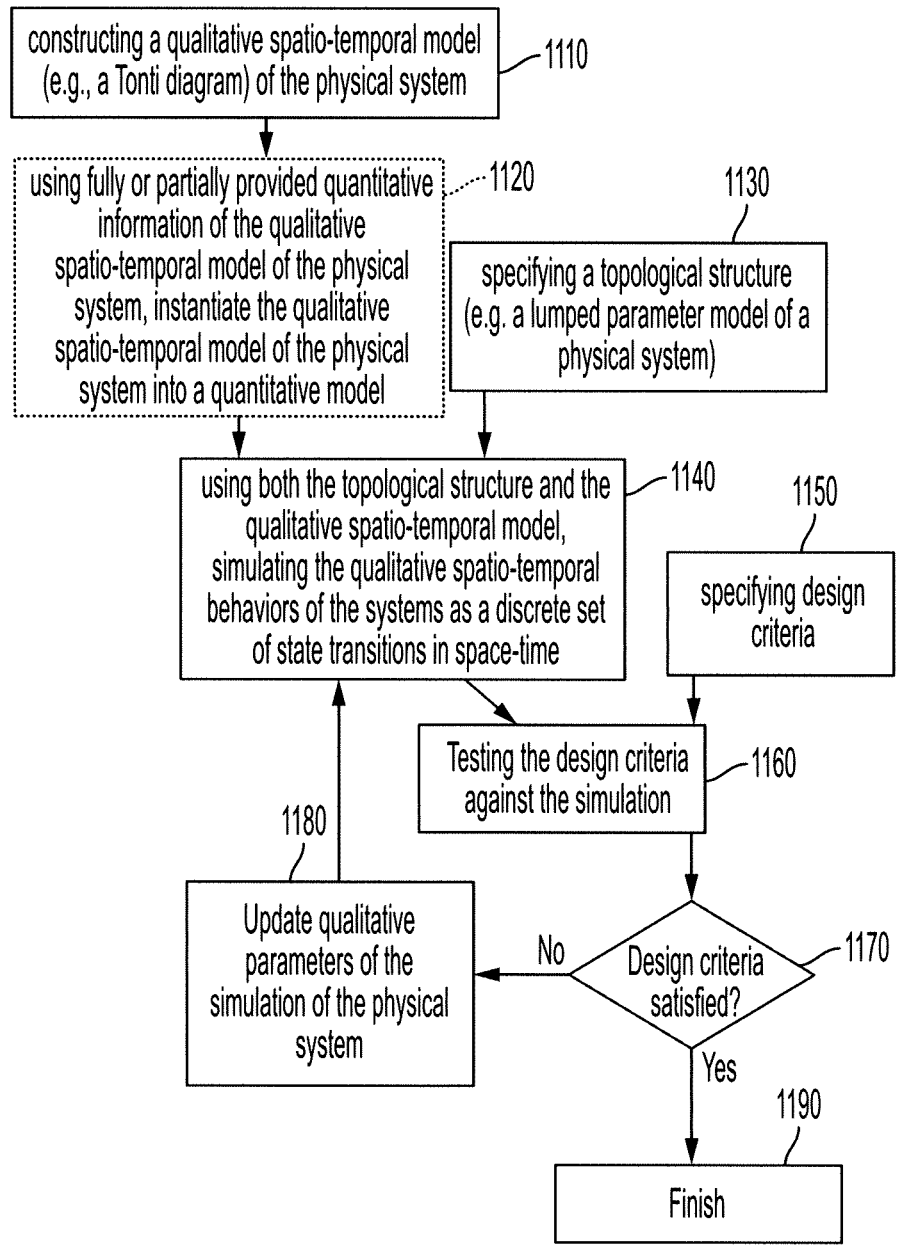
FIG. 11 is a flowchart of an embodiment of the systems and methods described herein.
Figure 12:
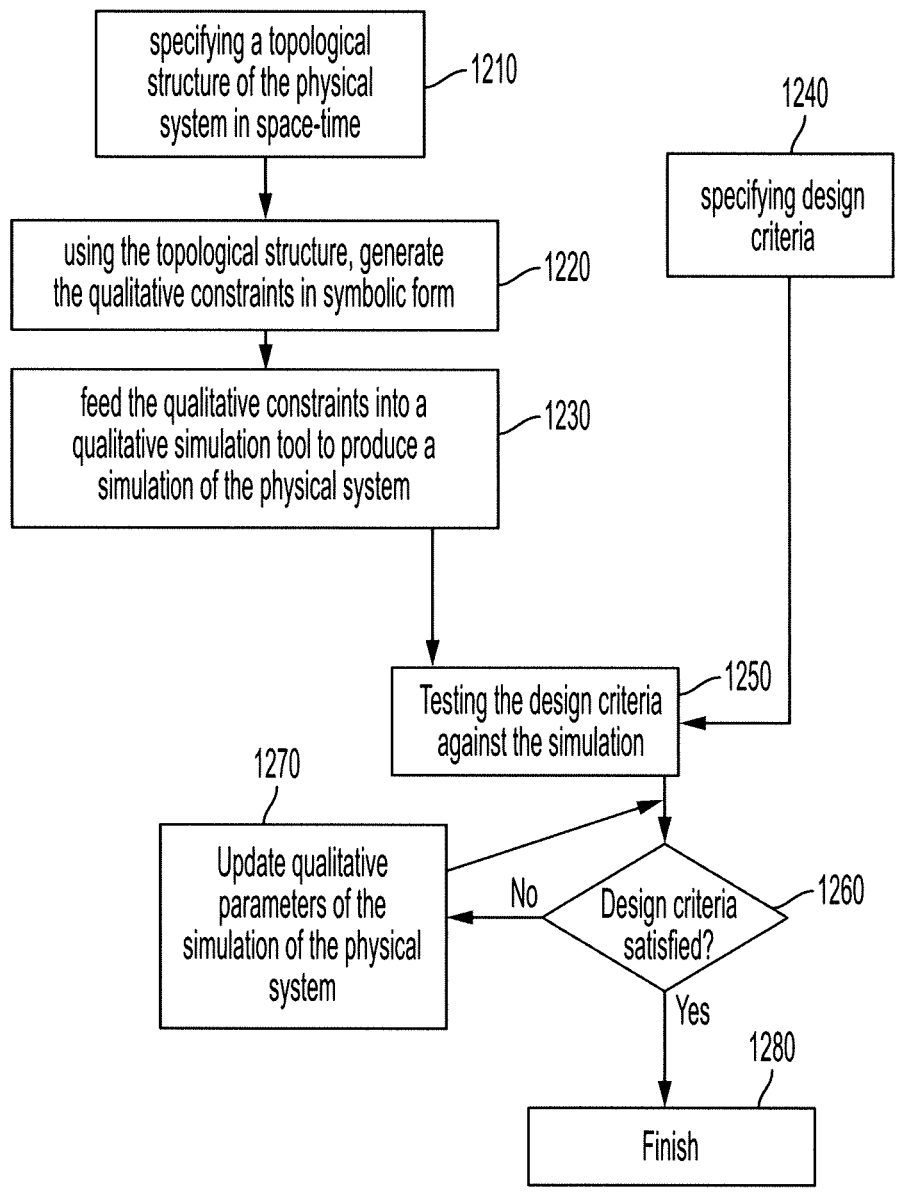
FIG. 12 is a flowchart of an embodiment of the systems and methods described herein.
Figure 13:
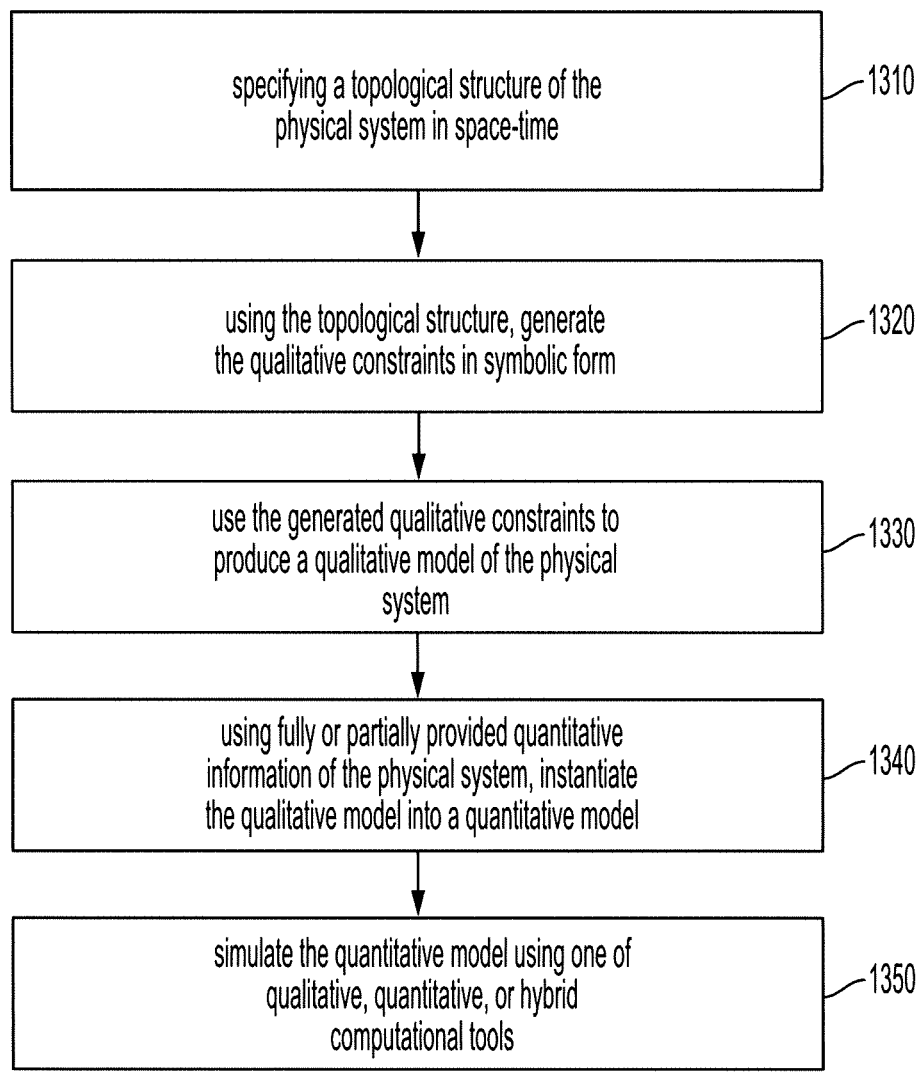
FIG. 13 is a flowchart of an embodiment of the systems and methods described herein.

FIGS. 11-13 show flowcharts of embodiments of the systems and methods described herein.

With reference to FIG. 11, at step 1110, a qualitative spatio-temporal model of the physical system is constructed. In an optional step 1120, using fully or partially provided quantitative information of the qualitative spatio-temporal model of the physical system, the qualitative spatio-temporal model of the physical system is instantiated into a quantitative model. At step 1130, a topological structure of a physical system in space-time is specified. At step 1140, using both the topological structure and the qualitative spatio-temporal model, the qualitative spatio-temporal behaviors of the physical system are simulated as a discrete set of state transitions in space-time to produce a simulation of the physical system. Specifically, the discrete set of state transitions refers to the changes of the system's qualitative states, that is, at least one physical variable or its derivatives reaches or leaves a landmark value of its quantity space. Such changes are usually not continuous in time and space so the behavior of the physical system is a discrete set of such changes (state transitions). At step 1150, design criteria are specified. Some commonly used design criteria are the number of specific types of components, the real time capability, stability, robustness, controllability, and/or the reasonableness of qualitative components to use. Other design criteria are contemplated as well. At step 1160, the design criteria are tested against the simulation. For example, by a brute force method, each parameter or a subset of the parameters may be tested one by one against the design criteria. Alternatively, in another example, a most sensitive parameter may be determined and updated. The most sensitive parameter is usually determined by an iterative test procedure where, at each iteration, engineers remove one parameter but keep the other parameters unchanged to see the change of the simulation result (e.g., if removing the parameter k while keeping the other parameters unchanged has the largest effect on the simulation result, then k is called the most sensitive parameter). At step 1170 it is determined if the design criteria are satisfied. If not, at step 1180, the qualitative parameters of the simulation of the physical system are updated, and the method returns to step 1170. If the design criteria are satisfied at 1170, the method finishes at step 1190.

With reference to FIG. 12, at step 1210, a topological structure of the physical system in space-time is specified. At step 1220, using the topological structure, qualitative constraints in symbolic form are generated. At step 1230, the qualitative constraints are fed into a qualitative simulation tool to produce a simulation of the physical system. At step 1240 design criteria are specified. At step 1250, the design criteria are tested against the simulation. At step 1260, it is determined if the design criteria are satisfied. If not, at step 1270, parameters of the simulation of the physical system are updated, and the method returns to step 1260. If the design criteria are satisfied at 1260, the method finishes at step 1280.

With reference to FIG. 13, at step 1310, a topological structure of the physical system in space-time is specified. At step 1320, using the topological structure, qualitative constraints in symbolic form are generated. At step 1330, the generated qualitative constraints are used to produce a qualitative model of the physical system. At step 1340, using fully or partially provided quantitative information of the physical system, the qualitative model is instantiated into a quantitative model. At step 1350, the quantitative model is simulated using one of qualitative, quantitative, or hybrid computational tools.

It will be further appreciated that the techniques disclosed herein may be embodied by a non-transitory storage medium storing instructions readable and executable by an electronic data processing device to perform the disclosed techniques. Such a non-transitory storage medium may comprise a hard drive or other magnetic storage medium, an optical disk or other optical storage medium, a cloud-based storage medium such as a RAID disk array, flash memory or other non-volatile electronic storage medium, or so forth. It will be further appreciated that the techniques disclosed herein may be embodied by one or more processors.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A device comprising:
at least one processor;
and at least one memory including computer program code;
the at least one memory and the computer program code configured to, with the at least one processor, cause the device to:
specify a topological structure of a physical system in space-time;
construct a qualitative spatio-temporal model of the physical system, wherein the qualitative spatio-temporal model of the physical system is expressed by topological semantics based on a Tonti diagram in which qualitative states of physical variable are systematically organized as nodes on the Tonti diagram and governing expressions constraining the qualitative states are symbolically expressed as connections between selected nodes on the Tonti diagram; and
using both the topological structure and the qualitative spatio-temporal model, simulate the qualitative spatio-temporal behaviors of the physical system as a discrete set of state transitions in space-time to produce a simulation of the physical system.

2. The device according to claim 1, wherein the device is further caused to perform spatio-temporal multi-physics qualitative reasoning.

3. The device according to claim 1, wherein the at least one memory and the computer program code are further configured to, with the at least one processor, cause the device to produce the simulation using a qualitative reasoning tool.

4. The device according to claim 1, wherein the at least one memory and the computer program code are further configured to, with the at least one processor, cause the device to:
specify at least one design criteria; and
test the results of simulation against the design criteria.

5. The device according to claim 1, wherein the at least one memory and the computer program code are further configured to, with the at least one processor, cause the device to use the simulation of the physical system to modify the qualitative spatio-temporal model of the physical system.

6. The device according to claim 1, wherein the at least one memory and the computer program code are further configured to, with the at least one processor, cause the device to perform the following operations:
(i) specify at least one design criteria;
(ii) update at least one qualitative parameter of a set of qualitative parameters of the simulation of the physical system; and
(iii) iterate though operation (ii) until the results of the simulation of the physical system satisfy the design criteria.

7. The device according to claim 1, wherein the at least one memory and the computer program code are further configured to, with the at least one processor, cause the device to:
using fully or partially provided quantitative information of the qualitative spatio-temporal model of the physical system, instantiate the qualitative spatio-temporal model of the physical system into a quantitative or hybrid (qualitative and quantitative) model; and
simulate the quantitative or hybrid model using one of qualitative, quantitative, or hybrid computational tools.

8. A device for generating qualitative constraints that govern a spatio-temporal behavior of a physical system, the device comprising:
at least one processor;
and at least one memory including computer program code;
the at least one memory and the computer program code configured to, with the at least one processor, cause the device to:
specify a topological structure of the physical system in space-time; and using the topological structure, generate the qualitative constraints in symbolic form, wherein the qualitative constraints may be fed into a qualitative simulation tool comprising a qualitative spatio-temporal model wherein the qualitative spatio-temporal model of the physical system is expressed by topological semantics based on a Tonti diagram in which qualitative states of physical variable are systematically organized as nodes on the Tonti diagram and governing expressions constraining the qualitative states are symbolically expressed as connections between selected nodes on the Tonti diagram.

9. The device of claim 8, wherein the at least one memory and the computer program code are further configured to, with the at least one processor, cause the device to generate the qualitative constraints based on at least one of defining, topological, constitutive, and interaction equations.

10. The device of claim 8, wherein the at least one memory and the computer program code are further configured to, with the at least one processor, cause the device to feed the qualitative constraints into the qualitative simulation tool to produce a simulation of the physical system.

11. The device of claim 8, wherein the at least one memory and the computer program code are further configured to, with the at least one processor, cause the device to:
    feed the qualitative constraints into the qualitative simulation tool to produce a simulation of the physical system; and
    use the simulation of the physical system to modify the qualitative model of the physical system.

12. The device according to claim 8, wherein the at least one memory and the computer program code are further configured to, with the at least one processor, cause the device to perform the following operations:
    (i) specify at least one design criteria;
    (ii) update at least one qualitive parameter of a set of qualitative parameters of the simulation of the physical system by; and
    (iii) iterate though operation (ii) until the results of the simulation of the physical system satisfy the design criteria.

13. The device of claim 8, wherein the at least one memory and the computer program code are further configured to, with the at least one processor, cause the device to:
    use the generated qualitative constraints to produce the qualitative model of the physical system; and
    using fully or partially provided quantitative information of the physical system, instantiate the qualitative model into a quantitative or hybrid (qualitative and quantitative) model.

14. The device of claim 8, wherein the at least one memory and the computer program code are further configured to, with the at least one processor, cause the device to:
    use the generated qualitative constraints to produce the qualitative model of the physical system;
    using fully or partially provided quantitative information of the physical system, instantiate the qualitative model into a quantitative or hybrid (qualitative and quantitative) model; and
    simulate the quantitative or hybrid model using one of qualitative, quantitative, or hybrid computational tools.

15. A method for qualitatively simulating spatio-temporal behaviors of a physical system, said method comprising:
    specifying a topological structure of the physical system in space-time;
    constructing a qualitative spatio-temporal model of the physical system, wherein the qualitative spatio-temporal model of the physical system is expressed by topological semantics based on a Tonti diagram in which qualitative states of physical variable are systematically organized as nodes on the Tonti diagram and governing expressions constraining the qualitative states are symbolically expressed as connections between selected nodes on the Tonti diagram; and
    using both the topological structure and the qualitative spatio-temporal model in conjunction with performing spatio-temporal multi-physics qualitative reasoning to simulate the qualitative spatio-temporal behaviors of the physical system as a discrete set of state transitions in space-time.

16. A device comprising:
    at least one processor;
    and at least one memory including computer program code;
    the at least one memory and the computer program code configured to, with the at least one processor, cause the device to:
    specify a topological structure of a physical system in space-time;
    construct a qualitative spatio-temporal model of the physical system, wherein the qualitative spatio-temporal model of the physical system is expressed by topological semantics based on a Tonti diagram in which qualitative states of physical variable are systematically organized as nodes on the Tonti diagram and governing expressions constraining the qualitative states are symbolically expressed as connections between selected nodes on the Tonti diagram;
    use at least one of fully or partially provided quantitative information of the qualitative spatio-temporal model of the physical system to instantiate the qualitative spatio-temporal model of the physical system into at least one of a quantitative or hybrid model, wherein the hybrid model is a combination of a qualitative and quantitative model; and
    using both the topological structure and the qualitative spatio-temporal model, simulate the qualitative spatio-temporal behaviors of the physical system as a discrete set of state transitions in space-time to produce a simulation of the physical system.

* * * * *